United States Patent [19]
Stallard

[11] 3,946,968
[45] Mar. 30, 1976

[54] APPARATUS AND METHOD FOR AERODYNAMIC CROSS-COUPLING REDUCTION

[75] Inventor: David V. Stallard, Wayland, Mass.

[73] Assignee: Raytheon Company, Lexington, Mass.

[22] Filed: Aug. 2, 1974

[21] Appl. No.: 494,682

[52] U.S. Cl. .............................................. 244/3.21
[51] Int. Cl.² .............................................. F42B 15/02
[58] Field of Search.................. 244/3.16, 3.19, 3.21

[56] References Cited
UNITED STATES PATENTS

| | | | |
|---|---|---|---|
| 2,924,401 | 2/1960 | Goss et al. | 244/3.21 |
| 2,969,017 | 1/1961 | Kershner | 244/3.21 |
| 3,000,597 | 9/1961 | Bell et al. | 244/3.21 |
| 3,065,931 | 11/1962 | Dixon et al. | 244/3.16 |
| 3,415,466 | 12/1968 | Poole, Jr. | 244/3.16 |

Primary Examiner—Verlin R. Pendegrass
Attorney, Agent, or Firm—Philip J. McFarland; Joseph D. Pannone

[57] ABSTRACT

An improved flight control system for use in guided missiles having a plurality of individually actuable control surfaces is shown. In order to overcome the deleterious effects of aerodynamic cross-coupling between control surfaces at a high angle of attack, the disclosed system includes means for first determining the lift force and roll moment of each control surface, and then, in accordance with the determined values of such forces and moments, controlling separately the total pitch lift force, yaw lift force and roll moment generated by all control surfaces. Any desired maneuver, either in pitch or yaw (or both), may therefore be executed without causing any unwanted motion of the missile, such as motion in an undesired plane or rolling of the missile.

2 Claims, 7 Drawing Figures

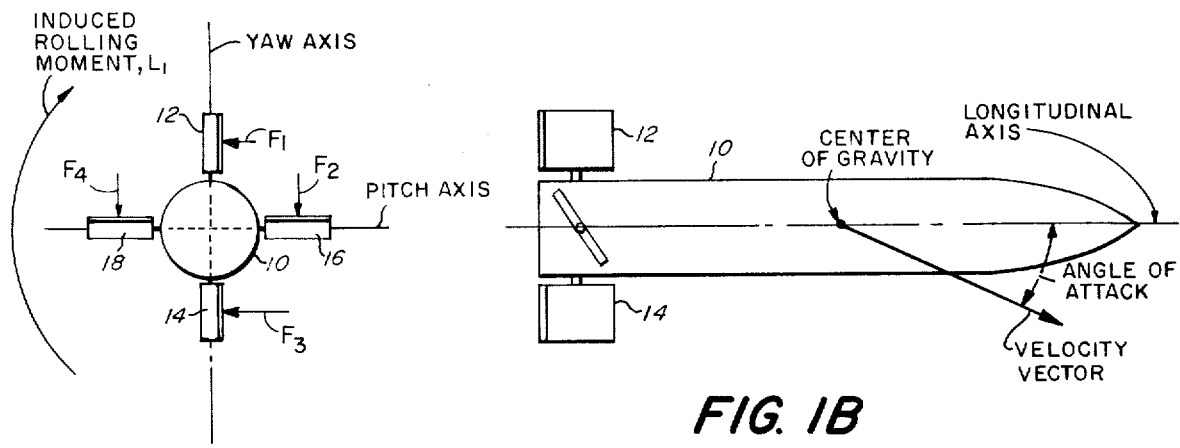
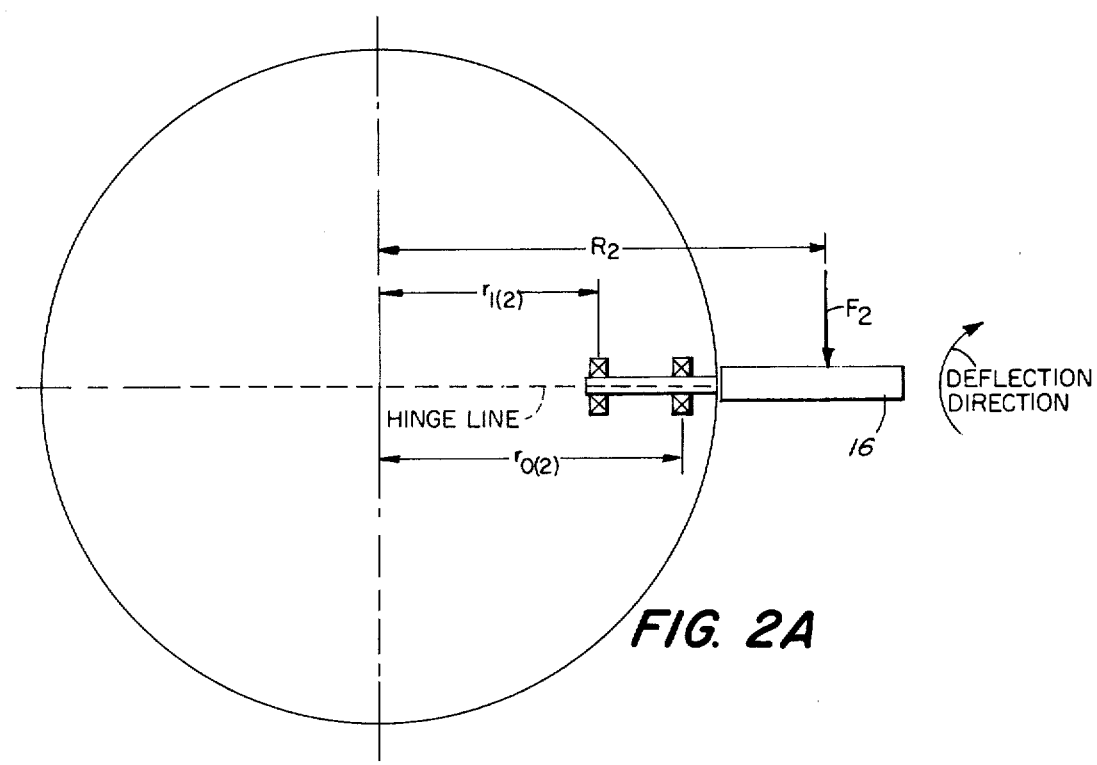

APPARATUS AND METHOD FOR AERODYNAMIC CROSS-COUPLING REDUCTION

The invention herein described was made in the course of or under a contract or subcontract thereunder, with the Department of Defense.

BACKGROUND OF THE INVENTION

This invention pertains generally to missile flight control systems and particularly to those in which the missile is a body of revolution with four movable control surfaces, commonly referred to as "control fins," in a cruciform array.

It is well known in the art that a missile of the type herein contemplated for guided atmospheric flight may be required to maneuver in any lateral direction during an interception of a target and that any required maneuver may be effected by appropriate aerodynamic lift forces determined by a flight control system. In order to permit a maneuver in any lateral direction regardless of angle of attack, such a missile has at least two axial planes of symmetry forming a cruciform cross-section on the arms of which four identical movable control surfaces (and sometimes four identical fixed surfaces) are disposed. The flight control system typically consists of a pitch autopilot and a yaw autopilot for controlling lateral acceleration of the missile in two mutually orthogonal planes and, additionally, a roll autopilot. The roll autopilot is required to maintain a nominally constant roll attitude so that the other two autopilots can function normally without compensating for rapid rolling and so that the missile radar seeker (if such a seeker is used) can maintain the proper orientation with respect to the polarization of external radar signal. In many missiles, each autopilot has a rate gyroscope for damping feedback, and in the case of pitch and yaw, an accelerometer for the measurement and feedback of lateral acceleration in, respectively, the pitch and yaw planes. The autopilots then generate commands for a control actuation system which in turn moves the four control fins as required to effect any desired maneuver.

The control actuation system includes conventional actuators to turn the control fins relative to the body of the missile and, in some missiles, other apparatus such as servoamplifiers and potentiometers to control fin angle. The primary purpose of the control fins is to develop aerodynamic moments on the missile for flight control, although a secondary purpose may be to develop lift for lateral acceleration as in a canard-controlled missile. In the case when the missile guidance system calls for a constant pitch acceleration, the pitch autopilot changes the deflection of the appropriate control surfaces; at equilibrium, however, fin deflections are constant and a constant angle of attack is maintained, with constant lateral acceleration in the pitch plane.

A practical interceptor missile must rely mainly on aerodynamic lift of its body at an angle of attack to develop the necessary large lateral accelerations for homing on a target (which ordinarily is moving and which may be taking evasive action). In general, such aerodynamic lift is developed by controlling the angle of attack (meaning the angle between the longitudinal centerline and the velocity vector of the missile) with control moments from the control fins. It is evident larger air pressures exist on the windward portions of the missile than on leeward portions and that concomitant differences in air pressure exist on the different control fins. For a high dynamic pressure of the free-stream, e.g. at high Mach number and low altitude, only a small angle of attack is necessary for a moderate lateral acceleration. In this case the four control surfaces (and four fixed surfaces, if provided) are about equally effective, and the three autopilots function independently without significant coupling effects.

For high altitude flight with a low free-stream dynamic pressure, a large angle of attack, e.g. over 20°, may be required to develop sufficient aerodynamic lift for homing. In this case the windward control surfaces are subjected to appreciably higher air pressures than the leeward surfaces. Moreover, the nose and wiring humps (if any) cause air vortices which change the air pressure distribution over the various control surfaces. Hence, the effectiveness, i.e. the lift force per degree of deflection, is higher for a windward control surface than for the diametrically opposite leeward control surface. Each of the three conventional autopilots deflects one or two diametral pairs of the control surfaces through equal deflections. The final result in such a situation is that the pitch or yaw fin deflections can induce unwanted roll moments, while the roll fin deflections can induce unwanted pitch or yaw moments. Such induced unwanted moments may be termed "aerodynamic cross-coupling."

The problem of aerodynamic cross-coupling is not restricted to a missile with a simple body-tail configuration. The problem is complicated, with a winged missile, by the vortices formed by the wings, or strakes. Such vortices impinge on the control surfaces and change the distribution of local air pressures on such surfaces. The problem is also complicated with a canard-controlled missile where movable forward surfaces cause a changing downwash impinging on the aft fixed surfaces to induce unwanted moments.

Such aerodynamic cross-coupling causes unwanted rolling of the missile, interferes with proper guidance and may even cause a loss of stability in the flight control system.

In order to overcome the problems of aerodynamic cross-coupling, various missile configurations have been proposed. Thus, for example, a "ring-tailed" species of missile which has a bracelet-shaped airfoil supported by fixed thin struts from the body of the missile with an annular space has been devised. The airfoil provides the desired lift force with a minimum of an unwanted roll moment. Unfortunately, however, such a missile is expensive and the airfoil cannot be deflected to allow complete control of missile direction. Another type of missile utilizes a spinning tail section supported on a roll bearing; such an arrangement is not susceptible to induced roll moments, but cannot counteract roll moments due to other reasons.

At the present state of development of the art, most guided missiles utilize a cruciform configuration for the control surfaces or fins. A newly considered "interdigitated" missile of such configuration has four movable tail fins and four fixed strakes alternately and evenly disposed around the missile. During an intercept the missile is rolled so that required lateral maneuvers take place in the most favorable plane relative to the control fins. While the missile may be so rolled during the initial and midcourse phases of an intercept, in the rapidly changing terminal phase of homing, the requisite control of roll attitude is almost impossible to achieve. Thus, although cross-feeds between the roll and yaw autopilots are provided, the flight-control-system stability of such a missile is still somewhat marginal at high angles of attack. More recently, it has been proposed to utilize an on-board digital computer in a cruciform missile to develop fin commands which will minimize adverse aerodynamic cross-coupling, but this technique will require appreciable data storage and computation.

SUMMARY OF THE INVENTION

Therefore, it is a primary object of this invention to provide a flight control system for a guided missile whereby the effect of aerodynamic cross-coupling is minimized, thereby improving the stability of the flight control system and the accuracy of guidance.

Another object of this invention is to meet the primary object without resorting to a radical aerodynamic configuration with high drag or high cost or other disadvantages.

These, and other objects of this invention to be discerned, are attained generally in my system wherein the control of lift forces and roll moments, rather than angles or rates of the control fins, is utilized to attain the desired maneuver and to suppress aerodynamic cross-coupling during all phases of an intercept.

My contemplated system is characterized by: (a) Four conventional cruciform control surfaces, each hinged to the missile through an inner and an outer bearing; (b) an actuator for each such surface; (c) electrical means for measuring bearing-reaction force in the direction of the adjacent hinge-line at the inner bearing and at the outer bearing of each control surface; (d) means for computing the aerodynamic force component (hereinafter referred to as either the "aerodynamic" or "lift" force) in the direction of the adjacent hinge line and roll moment of each control surface from its two bearing-reaction-force signals; (e) a pitch autopilot with conventional amplifiers and instruments to command control fin lift forces so as to control the pitch lateral acceleration of the missile; (f) a corresponding yaw autopilot; (g) a roll autopilot to command control fin roll moments so as to maintain a preferred roll orientation of the missile; and (h) auxiliary means to suppress excessive drag of the four control fins.

BRIEF DESCRIPTION OF THE DRAWINGS

For a more complete understanding of my invention, reference is now made to the following description of a preferred embodiment as illustrated in the accompanying drawings wherein:

FIGS. 1A and 1B are sketches of a cruciform body-tail missile, simplified to illustrate the location and orientation of the control fins and how unwanted roll moments are induced. Aerodynamic forces $F_1$ through $F_4$ are all in the plane of the hinge-lines, i.e. the plane of FIG. 1A;

FIG. 2A is a cross-section of the sketched missile in the plane of the four hinge-lines of the control fins, showing one control fin and its two bearings, but not its actuator;

FIG. 2B is a free-body diagram of the control fin illustrated in FIG. 2A showing the bearing-reaction forces and the total aerodynamic lift force, the latter being shown for convenience as concentrated at the center of pressure on the control fin;

DESCRIPTION OF THE PREFERRED EMBODIMENT

Figure 2:
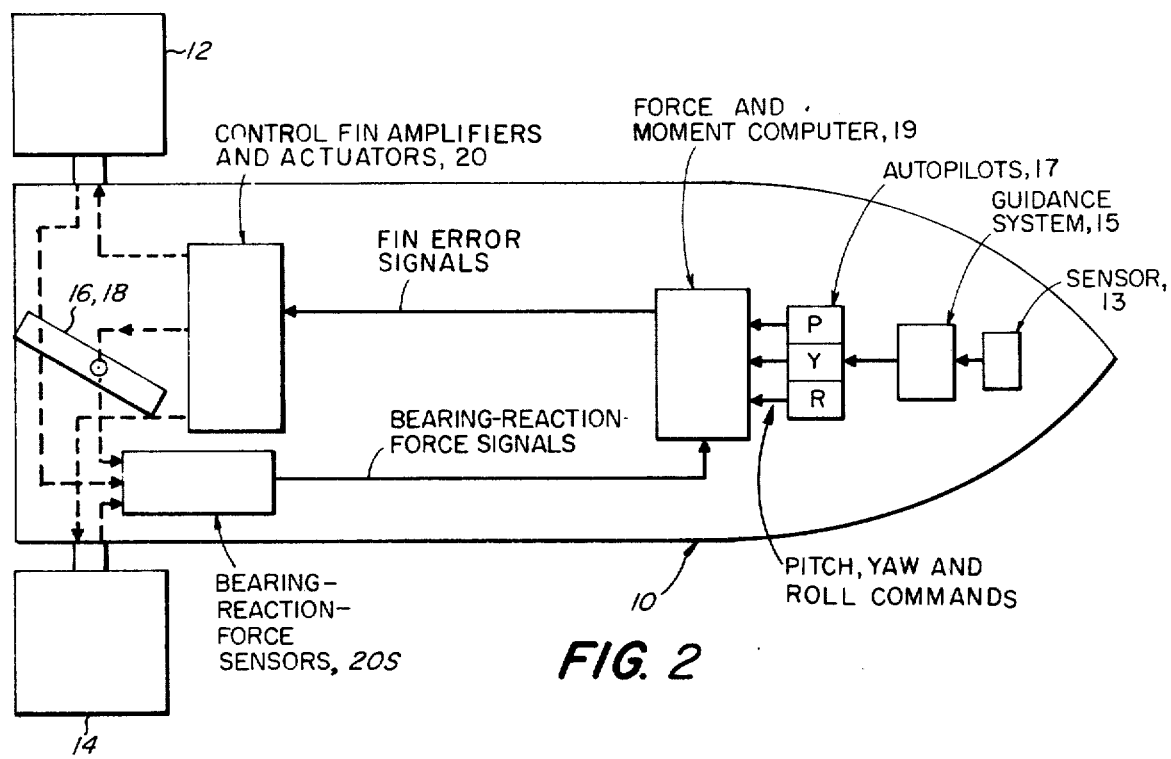
FIG. 2 is a sketch of a cruciform body-tail missile illustrating generally my concept of determining and controlling the total pitch force, yaw force and roll moment of the control fins so as to reduce the induced roll moments and other aerodynamic cross-coupling effects.

Before referring to the FIGURES, it is first noted that a cruciform body-tail missile is preferred because it has no surfaces other than the four control surfaces to induce unwanted moments when the angle of attack is varied.

FIG. 1A and 1B illustrate the problem of aerodynamic cross-coupling in a simple case. It will be seen that a cruciform body-tail missile includes a streamlined body 10 having individually movable control fins 12, 14, 16, 18. In the illustrated example the control fins 16, 18 are rotated to cause the exemplary angle of attack of the missile 10 in the pitch plane as shown. If, then, the control fins 12, 14 were to be rotated through equal angles by a conventional autopilot to cause the missile 10 to yaw, it is obvious that the aerodynamic force, $F_3$, on the windward control fin 14 would be greater than the corresponding force, $F_1$, on the leeward control fin 12. Therefore, an undesired roll moment in addition to the desired yaw moment would be induced, thereby causing the missile to roll until the roll autopilot is able to stop such rolling by equal roll deflections of all four control fins. Such roll deflections would, in turn, induce an unwanted yaw moment. In some cases such aerodynamic cross-coupling could result in unacceptably poor rolling guidance, or even loss of stability of the flight control system.

It is evident that, in any body-tail missile, virtually all of any roll moment, whether wanted or unwanted, is exerted on the four movable tail fins. Also, most of any change in total pitch force, or total yaw force, due to control fin deflection is that corresponding respectively to a change in the aerodynamic forces $F_2$ and $F_4$ or to a change in the aerodynamic forces $F_1$ and $F_3$. In my contemplated flight control system as illustrated in FIG. 2, the aerodynamic forces $F_1$, $F_2$, $F_3$, $F_4$ and the associated control-fin roll moments $L_1$, $L_2$, $L_3$, $L_4$ are determined. If there is a net algebraic sum of the fin roll moments, induced by the maneuvering deflections of the control fins, then the fins are moved differentially to null out any such sum of the roll moments. Therefore, any desired yaw or pitch maneuver would be accomplished without inducing any significant roll moments to cause unwanted rolling by applying appropriate control-fin forces.

Referring now to FIG. 2 it may be seen that many components of my contemplated flight control system are conventional. Thus, assuming that the missile is to be guided toward a target (not shown) using the well known "proportional navigation" technique, a sensor 13 is mounted to track the target thereby producing a boresight error signal which is fed to a guidance system 15 to produce command signals for autopilots 17. All of the aforementioned components preferably are conventional except that the autopilots 17 are arranged to produce pitch-force-command, yaw-force-command and roll-moment-command signals rather than control-fin-deflection command signals as are customarily produced. These command signals are applied to a force and moment computer 19 (whose elements will be discussed hereinafter) along with bearing-reaction-force signals from a plurality of bearing-reaction-force sensors 20S (whose elements will also be discussed hereinafter). Suffice it to say here that the force and moment computer 19 combines the aforementioned command signals and the bearing-reaction-force signals to produce fin error signals which cause each one of the control fins 12, 14, 16, 18 to be deflected, by means of conventional control fin amplifiers and actuators 20, until the flight path of the missile is changed as required to null out the rate of angular rotation of the line of sight from the missile to the target. The deflections of the control fins 12, 14, 16, 18 are effected in such a way as to cancel unwanted roll moments, thereby reducing undesirable aerodynamic cross-coupling between control fins to an acceptable level.

Referring now to FIGS. 2A and 2B, the bearing-reaction forces of an exemplary one of the control fins in the plane of its adjacent hinge lines, i.e. forces $F_{i(2)}$ and $F_{o(2)}$ in the case of control fin 16, are measured so that the aerodynamic force $F_2$ and the roll moment $L_2$ due to movement of such control fin may be computed. If, then, the corresponding lift force and roll moment due to movement of the remaining control fins are computed, the induced rolling moment L may be determined as the sum $(L_1+L_2+L_3+L_4)$ and the control fins may be moved to counteract such moment. It is desired to perform the measurements of bearing-reaction forces with mechanically stiff instrumentation producing electrical signals, such as calibrated strain gauges mounted between the bearings and the supports for the bearings.

It is apparent that the lift force $F_2$ in the plane of the adjacent hinge lines is given by:

$$F_2 = F_{o(2)} - F_{i(2)} \qquad (1)$$

where each term is defined above.

Figure 3:
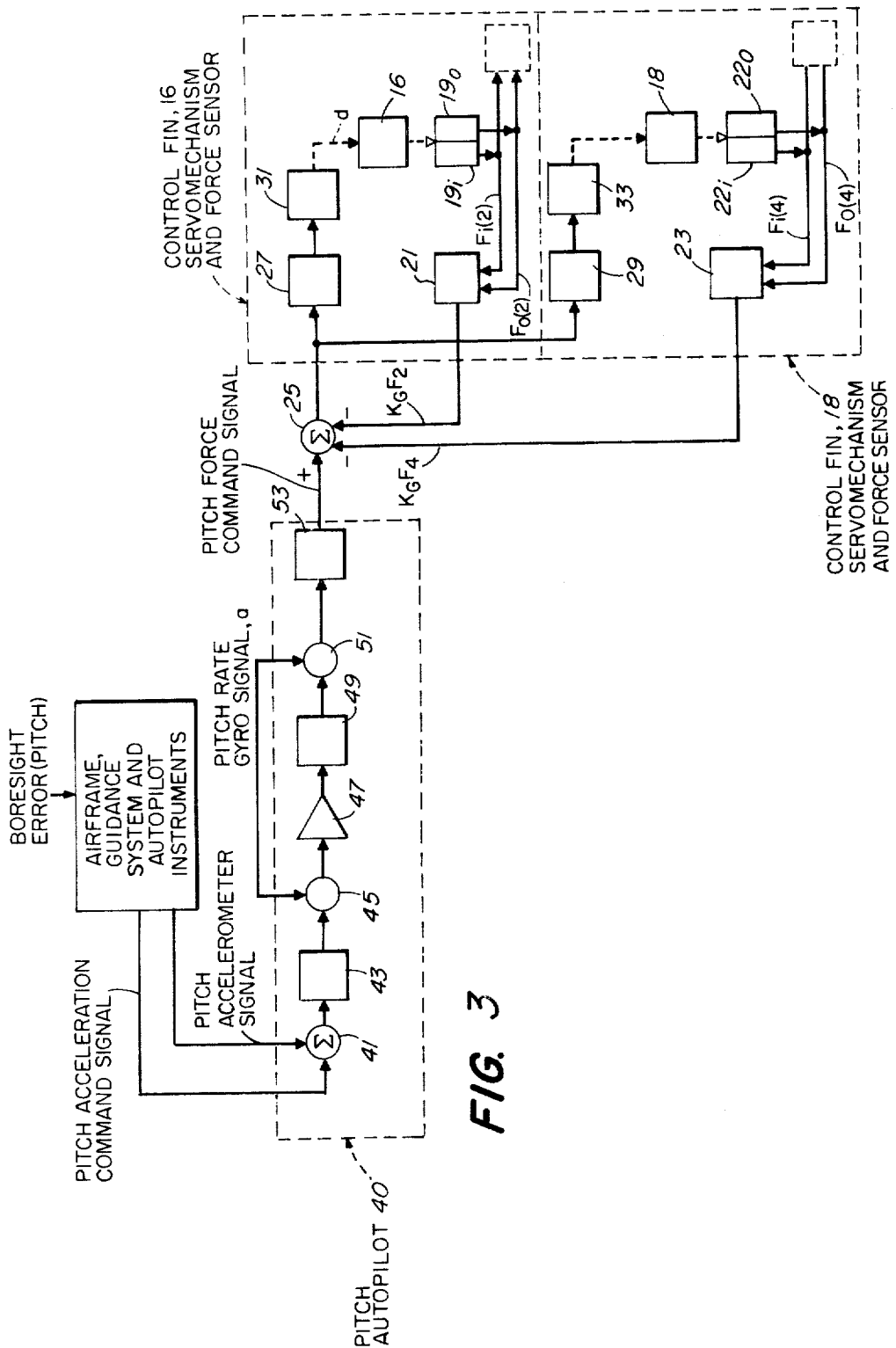
FIG. 3 is a simplified block diagram illustrating my concept of controlling the pitch deflection of control fins in a cruciform missile by measuring bearing reaction forces.

Referring now to FIG. 3 it may be seen that electrical signals $F_{i(2)}$ and $F_{o(2)}$ from strain gauges 19i, 19o are connected to a block 21. These electrical signals, it will be noted, are analogous to the bearing-reaction forces within the bearings of control fin 16; it follows, then, that these electrical signals depend on the deflection of the control fin 16 and the velocity and altitude of the missile 10. The block 21 contains conventional summing circuitry and amplifier means to produce an electrical signal, $K_GF_2$, proportional to the lift force $F_2$. In like fashion electrical signals from strain gauges 22i, 22o are connected to block 23 to produce an electrical signal $K_GF_4$ proportional to the lift force $F_4$. Further, as will be shown in FIG. 4, electrical signals corresponding to forces $F_1$ and $F_3$ are similarly generated.

The electrical signals $K_GF_2$ and $K_GF_4$ are connected to a summer 25 which is also fed by a pitch force command signal indicative of the fin pitch force (here generated in a manner to be described) required during flight to maneuver the missile 10 in its pitch plane. (The pitch plane is perpendicular to the pitch axis in FIG. 1A and the pitch force is along the yaw axis of rotation.) The output of the summer 25 is an error signal to two conventional servo-amplifiers 27, 29 which, in turn, control two conventional actuators 31, 33, here shown, for simplicity, causing the control fins 16, 18 to rotate together until the error signal goes to zero.

The pitch force command signal is here generated by a pitch autopilot 40 responsive to electrical signals, i.e. a pitch acceleration command signal, a pitch accelerometer signal and a pitch rate gyro signal. Thus, the pitch acceleration command signal is generated, in any convenient known way, in response to a boresight error signal (pitch) from the sensor. The pitch accelerometer signal is also generated in a conventional way by an accelerometer in the missile which produces a signal proportional to the actual acceleration of the missile in the vertical, or pitch, plane, i.e. the lateral acceleration of the missile in the pitch plane. The two aforementioned signals are connected to a summer 41 whose output in turn is connected to an amplifier 43. The output of the latter then is an electrical signal proportional to the difference between a desired acceleration of the missile in the pitch plane (represented by the pitch acceleration command signal) and the actual acceleration of the missile in the pitch plane. Because the aerodynamic characteristics of the missile are such that direct application of the output of the amplifier 43 to the control fin actuating devices would result in unwanted oscillatory rotation (instability) about the pitch axis, conventional damping and stabilization circuitry is provided. Such circuitry here is shown to include: A summer 45, to which the output of the amplifier 43 and an electrical signal analogous to the actual pitch rate of the missile around the pitch axis is applied; an integrator 47 and an amplifier 49; and, a summer 51 to derive, from the output of the amplifier 49 and the output of the pitch rate gyro, an electrical signal proportional to the desired pitch-force-command signal. This latter electrical signal is then impressed on an amplifier 53, the gain of which is predetermined for the particular aerodynamic characteristics of the missile to produce, finally, a desired pitch-force-command signal. Further, it is apparent that multiplication of $F_2$ by a moment arm from the center of gravity (c.g.) of the missile to the center of pressure of the fin (which moment arm is nearly constant) gives the pitching moment exerted by control fin 16. The rolling moment $L_2$ exerted by control fin 16 on the missile 10 is given by:

$$L_2 = r_{i(2)} F_{i(2)} - r_{o(2)} F_{o(2)} \qquad (2)$$

Hence, simple analog techniques with resistors and amplifiers can be employed to compute $F_2$ and $L_2$ from $F_{i(2)}$ and $F_{o(2)}$.

Figure 4:
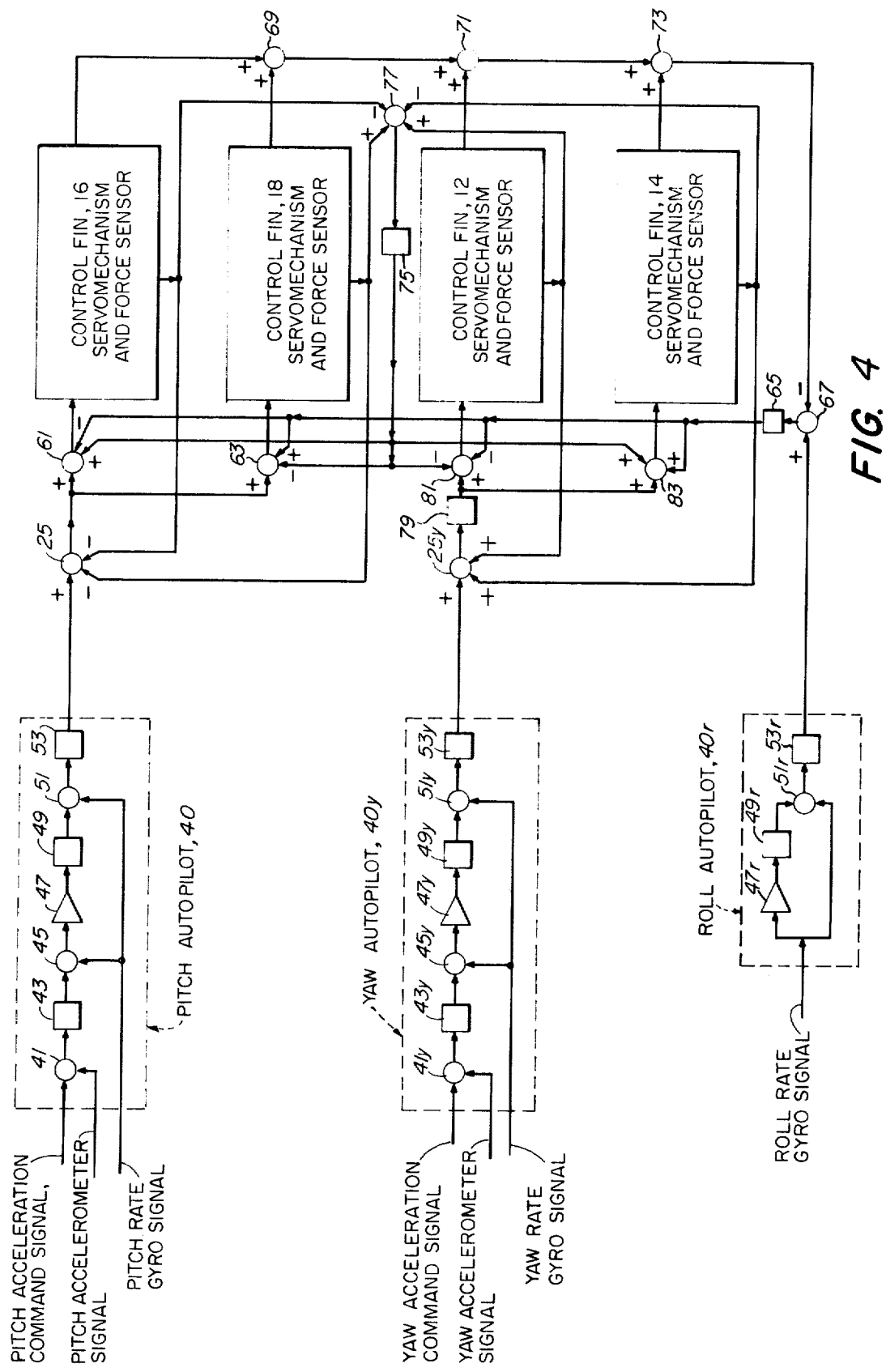
FIG. 4 is a block diagram of a complete flight control system incorporating my concepts, such system including pitch, yaw and roll autopilots.

Referring now to FIG. 4 it may be seen that the control fin position arrangement shown in FIG. 3 may be adapted for use in a missile with a yaw autopilot and a roll autopilot as well as a pitch autopilot. The algebraic sign convention in FIG. 4 is such that the fin forces $F_1$ and $F_3$ in FIG. 1A and corresponding fin angles $d_1$ and $d_3$ (not labeled) are positive, while the fin forces $F_2$ and $F_4$ in FIG. 1A and corresponding fin angles $d_2$ and $d_4$ are negative; moreover, in FIG. 4 the individual fin roll moments $L_1$, $L_2$, $L_3$ and $L_4$ are all positive in the clockwise direction shown in FIG. 1A.

As will be seen when the adaptation contemplated is properly made, the position of each one of the control fins 12, 14, 16 and 18 of a cruciform missile may be independently changed to produce the desired fin pitch force and fin yaw force, to counteract the deleterious effect of induced roll moment, and to counteract the deleterious effect of the "non-control force," to be explained later. It will be noted here that, for convenience, elements shown in FIG. 3 which appear also in FIG. 4 will be designated as in FIG. 3. Further, elements which have functions corresponding to the functions of elements shown in FIG. 3 will be designated using either letter or numeral subscripts. With the foregoing in mind, it may be seen that the pitch autopilot 40 in FIG. 4 is the same as the pitch autopilot 40 FIG. 3 and that the yaw autopilot 40$y$ in FIG. 4 has elements corresponding to those of the pitch autopilot 40, the difference between the two being the input signals applied thereto and the gain of the various amplifiers. The roll autopilot 40$r$ contains only damping and stabilization elements because such autopilot need only suppress the roll rate of the missile and maintain a nominally constant roll attitude.

The output signals of the pitch autopilot 40, the yaw autopilot 40$y$ and the roll autopilot 40$r$ are respectively a pitch-force-command signal, a yaw-force-command signal and a roll-moment command signal. These signals are fed respectively to summers 25, 25$y$ and 67. The first two of the aforementioned summers are also respectively connected to the outputs of blocks 21 and 23 and to the outpus of blocks 21 and $23_{(14)}$. The output of the summer 25, then, is the difference between the pitch-force-command signal and the total lift force signal on the control fins 16, 18 for reasons discussed in connection with FIG. 3; the output of the summer 25$y$ is the difference between the yaw-force-command signal and the total lift force on the control fins 12 and 14. The output of the summer 25 is connected to a summer 61 and a summer 63.

Each one of the summers 61, 63 is here shown as having two inputs in addition to the input from summer 25. The first of these additional inputs is taken, through an amplifier 65, from a summer 67. The inputs to the latter are the roll moment command signal from the roll autopilot 40$r$ and, by way of summers 69, 71, 73, the total roll moment to which the control fins 12, 14, 16, 18 are subbjected at any time. In other words, the output of the amplifier 65 is an electrical signal, proportional to the error in total roll moment, which calls for counteracting angular deflections from all four fins. The second additional input to the summers 61, 63 is taken, through an amplifier 75 from a summer 77, the output of which is the "noncontrol force," defined as $(F_1 - F_2 - F_3 + F_4)$. By illustration, let all forces in FIG. 1A be equal at equal radii, and let the directions of $F_3$ and $F_4$ be opposite to that shown. Then, since $F_1$ and $F_4$ are positive, while $F_2$ and $F_3$ are negative, the "noncontrol force" is $4F_1$, but the fin-pitch-force, fin-yaw-force and fin-roll-moment are all zero. Such unneccessary and ineffective deflections of the control fins cause an undesirable deceleration of the missile. Therefore, feedback through the summing point 77 is provided so as to cause fin deflections to null the deleterious "noncontrol force." In a similar fashion, each one of a pair of summers 81, 83 is fed by a yaw-force-command signal (from the yaw autopilot 40$y$ by way of summer 25$y$ and an inverter 79), a roll moment error signal (from amplifier 65) and an induced roll moment signal (from amplifier 75). In essence then the control fins are actuated at each moment during flight in such a manner that the desired fin-pitch-force and fin-yaw-force are provided for maneuvering, while the induced roll moment and the deleterious "noncontrol force" are eliminated. It follows then that, regardless of the angle of attack or of the altitude of the missile at any time, the aerodynamic cross-coupling from pitch and yaw into roll is virtually eliminated, while the aerodynamic cross-coupling from roll into pitch and yaw is sharply reduced.

Having described a flight control system configured to overcome the problem of aerodynamic cross-coupling between control fins, it will not be obvious to one of skill in the art that the described system is a new method for controlling missiles. That is, I contemplate that maneuvering of a missile be controlled by measuring the aerodynamic forces and roll moments (or forces directly related to the aerodynamic forces and roll moments) on the control fins of the missile and then controlling the deflection of each control fin to allow any desired maneuver to be effected without any significant aerodynamic cross-coupling between such fins. It will also be clear to one of skill in the art that the particular embodiment in FIGS. 1 through 4 may be modified without departing from my inventive concepts. For example, the missile in FIG. 1 could have strakes to increase lift without significantly increasing the coupling from pitch or yaw fin deflections to roll moment. The missile could utilize three equally-spaced control fins instead of the usual four, at a saving in cost and weight. In FIGS. 1A and 4 it is possible to have the pitch (or yaw) autopilot command all four fins if the pitch (or yaw) plane is defined as being 45° away from the fins. In FIG. 4 a roll-angle command may be added to the roll autopilot 40$r$. Moreover, other types of rate gyro and accelerometer feedback and other types of compensation may be used in the autopilots. It is felt, therefore, that this invention should not be restricted to its disclosed embodiment, but rather should be limited only by the spirit and scope of the appended claims.

What is claimed is:

1. In a flight control system for a cruciform missile having opposite pairs of control fins disposed around the body of such missile, the aerodynamic force on each one of such control fins during flight being dependent upon the angle of attack of such missile, the improvement comprising:
    a. means for continuously measuring the aerodynamic force on each separate one of the opposite pairs of control fins of the cruciform missile during flight and for producing a set of analogous electrical signals;
    b. computer means, responsive to the set of analogous electrical signals, for producing a first signal corresponding to the roll moment imparted to the cruciform missile by the aerodynamic force on the opposite pairs of control fins and for producing a second output signal corresponding to the sum of the differences in the aerodynamic forces on opposite pairs of control fins; and
    c. amplifier and actuator means, responsive to the first and the second signal out of the computer means, for independently rotating each separate one of the opposite pairs of control fins to null the first and the second signals out of the computer means, thereby to equalize the aerodynamic force on each one of the control fins.

2. The improvement as in claim 1 having, additionally:
    a. autopilot means for producing roll command signals as required during flight of the cruciform missile; and
b. means for combining the roll command signals out of the autopilot means with the second output signals out of the computer means to cause the cruciform missile to roll as required during flight.

* * * * *